United States Patent [19]

Sickafus

[11] Patent Number: 4,945,773
[45] Date of Patent: Aug. 7, 1990

[54] FORCE TRANSDUCER ETCHED FROM SILICON

[75] Inventor: Edward N. Sickafus, Gross Ile, Mich.

[73] Assignee: Ford Motor Company, Dearborn, Mich.

[21] Appl. No.: 319,495

[22] Filed: Mar. 6, 1989

[51] Int. Cl.$^5$ ............................................. G01P 15/08
[52] U.S. Cl. ........................... 73/862.59; 73/517 AV; 73/DIG. 1
[58] Field of Search ....... 73/517 AV, 862.59, DIG. 1

[56] References Cited

U.S. PATENT DOCUMENTS

| | | | |
|---|---|---|---|
| 4,286,459 | 9/1981 | Trimmer et al. | 73/862.59 |
| 4,345,474 | 8/1982 | Deval | 73/517 B |
| 4,435,737 | 3/1984 | Colton | 73/517 R |
| 4,483,194 | 11/1984 | Rudolf | 73/517 R |
| 4,674,319 | 6/1987 | Muller et al. | 73/23 |
| 4,679,434 | 7/1987 | Stewart | 73/517 B |
| 4,736,629 | 4/1988 | Cole | 73/517 R |
| 4,805,456 | 2/1989 | Howe et al. | 73/517 AV |

*Primary Examiner*—John Chapman
*Attorney, Agent, or Firm*—Allan J. Lippa; Peter Abolins

[57] ABSTRACT

An accelerometer fabricated by silicon etching techniques. A first suspended beam is formed having a first conductive portion, the beam being deflectable in response to an acceleration force. a second beam having second and third conductive portions is suspended over the first beam. Phased lock loop circuitry oscillates the second beam at resonance and provides an electrical signal proportional to the acceleration force.

21 Claims, 4 Drawing Sheets

1

FORCE TRANSDUCER ETCHED FROM SILICON

BACKGROUND OF THE INVENTION

The field of the invention relates to force transducers wherein an applied force, such as an acceleration force or a fluid pressure force, is converted into an electrical signal. In particular, the field of the invention relates to force transducers and methods for producing such transducers by etching silicon substrates.

Force transducers are known having a suspended mass, such as a pendulum or cantilever, which deflects in response to an applied force. Typically, capacitive plates are coupled to surfaces of both the suspended mass and an adjacent structure. As the suspended mass deflects, the resulting change in capacitance provides an electrical indication of the applied force.

An example of an accelerometer is disclosed in U.S. Pat. No. 4,679,434 issued to Stewart et al. A cantilever is formed by etching a substantially U-shaped cavity through a silicon wafer. Two Pyrex TM planar surfaces are then attached to opposing planar surfaces of the substrate such that the cantilever is suspended therebetween. Conductive plates are bonded to both Pyrex TM surfaces and the suspended mass. A differential amplifier applies a voltage to the plates in response to detected deflection of the suspended mass for restoring the suspended mass to its null position. The applied voltage is, allegedly, proportional to the applied force.

The inventor herein has recognized numerous disadvantages of the prior approaches. In motor vehicle applications, for example, accelerometers are deployed in air bag systems wherein false triggering due to noise is intolerable. When the motor vehicle traverses rough road surfaces, there may be deflection of the suspended mass due to noise resulting in erroneous interpretation as a collision. Since the prior approaches appear to have the ability of sensing displacement only in the time frame of motion of the suspended mass, their ability to discriminate against vehicular noise is limited. An additional disadvantage is that only a portion of the structure disclosed may be fabricated by silicon processing technology. Thus, the potential advantages of batch processing technology are not fully utilized. An additional disadvantage is that deflection of the suspended mass is essentially arcuate. Accordingly, capacitive changes and corresponding electrical measurements are nonlinear with respect to the applied force.

SUMMARY OF THE INVENTION

It is an object of the present invention to provide a force transducer fabricated by silicon processing technology having high noise immunity and linearity.

The above object is achieved, and disadvantages of prior approaches overcome, by providing both an apparatus for detecting an applied force and a method for fabricating the apparatus. In one particular aspect of the invention, the apparatus comprises: a first suspended beam etched from a silicon substrate, the first suspended beam having a first conductive portion and being deflectable in response to the applied force; a second suspended beam coupled to the substrate such that it is suspended opposite the first suspended beam, the second suspended beam including a second conductive portion and a third conductive portion both being positioned opposite the first conductive portion; power means for applying electrical power between the first conductive portion and the second conductive portion to oscillate the second suspended beam; and sensing means for sensing the applied force by sensing electrical power between the third conductive portion and the first conductive portion. Preferably, the power means includes a phased lock loop having feedback from the sensing means for oscillating the second suspended beam at its resonant frequency.

In another aspect of the invention, a pair of flexing means is included which are symmetrically positioned around the first suspended beam for providing linear deflection thereof in response to the acceleration force.

By oscillating the second beam as claimed above, deflection of the first suspended beam is sampled at a rate faster than the deflection thereby providing the advantage of higher immunity to noise than heretofore possible. Thus, false triggering such as when traversing a rough road surface, is substantially eliminated. Further, by providing a first suspended beam coupled at opposing ends, beam deflection is substantially linear with respect to an applied force. An advantage is thereby obtained of accurate sensing of an applied force.

In another aspect of the invention, a method for fabricating an apparatus for detecting an applied force is provided. More specifically, the method comprises the steps of: forming a sacrificial layer of an etchant material over one planar surface of a silicon substrate; forming a layer of polysilicon over the sacrificial layer; forming a first suspended beam by selectively etching the substrate; forming a second beam by selectively etching the polysilicon layer; etching away the sacrificial layer to suspend the second beam over the first suspended beam; forming conductive portions on both the first and the second beams; coupling an electrical oscillator between the conductive portions for oscillating the second beam; and coupling sensing circuitry between the conductive portions for sensing the applied force by sensing capacitive changes between the conductive portions.

The above aspect of the invention provides an advantage of fabricating the entire sensing apparatus by silicon processing technology.

BRIEF DESCRIPTION OF THE DRAWINGS

The above object and advantages may be better understood by reading the Description of the Preferred Embodiment with reference to the following drawings wherein.

DESCRIPTION OF THE PREFERRED EMBODIMENT

The invention claimed herein will be better understood by reading an example of a preferred embodiment, and a method for making the embodiment, described herein.

Figure 1:
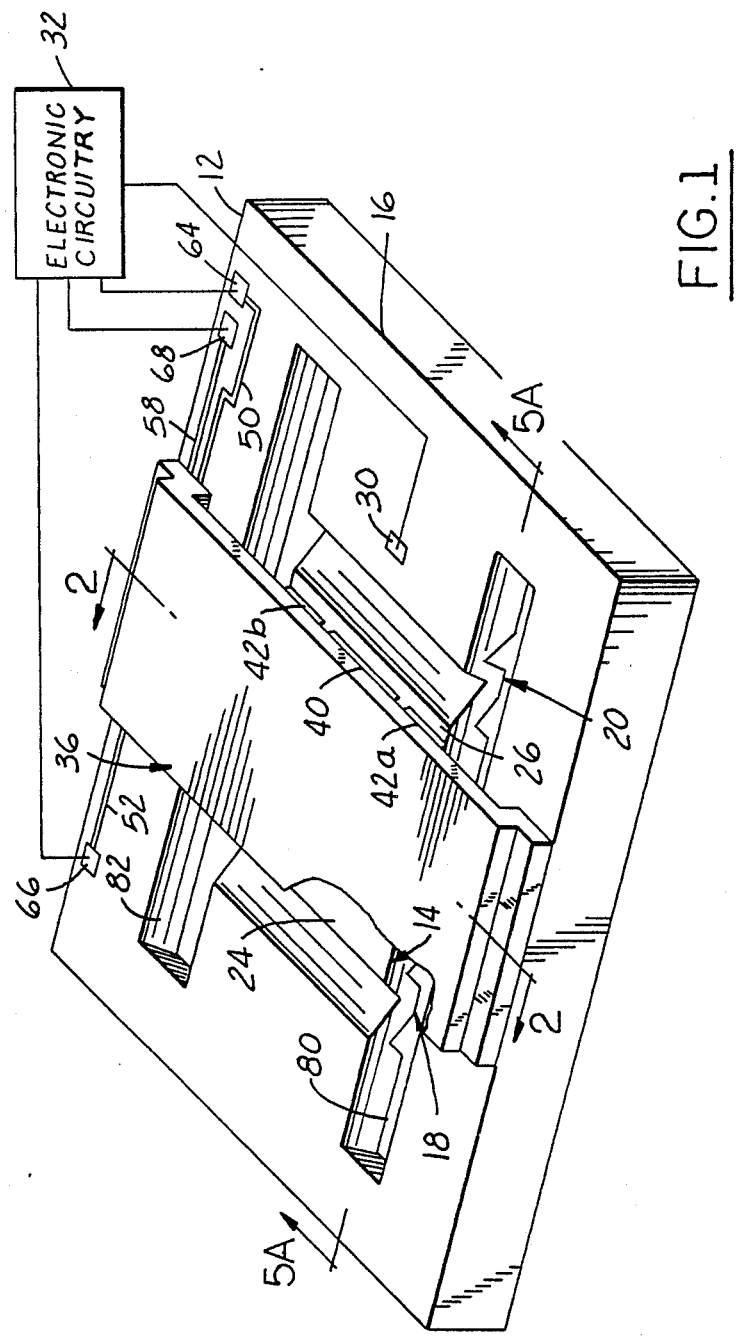
FIG. 1 is a perspective view of an embodiment which utilizes the invention to advantage.

Referring to FIG. 1, in general terms which are described in greater detail hereinafter, force transducer 10 is shown in this example fabricated from silicon substrate 12, {100} silicon in this example. Suspended beam 14 is shown integrally formed from substrate 12 and connected at its opposing ends to supporting frame 16 via respective flexing members 18 and 20 which are also integrally formed from silicon substrate 12.

For the particular example presented herein, force transducer 10 is shown as an accelerometer wherein beam 14 deflects in response to an acceleration force. With suitable modification, such as addition of a diaphragm, beam 14 may also be responsive to other applied forces such as fluid pressure. In the latter example, force transducer 10 may be utilized to advantage as a pressure transducer.

Flexing members 18 and 20 are shown symmetrically positioned around beam 14 such that beam deflection is rectilinear in response to the applied force. The mass of beam 14 and dimensions of flexing members 18 and 20 are chosen to provide a desired deflection and response time for a particular application. For example, when used as an accelerometer in an air-bag system, it was found desirable to sense up to 50 g's of acceleration in 20 ms. A corresponding deflection of 2 um in 20 ms was also found desirable. This deflection can be accommodated by a silicon sensing mass of 0.0012 grams supported by a flexing member having dimensions of 40 um × 5735 um × 897 um.

Suspended beam 14 includes conductive portion 24 (FIGS. 2 and 5a) which forms a capacitive plate. In this example, conductive portion 24 is formed by doping a pattern of ions on top surface 26 of beam 24 as described in more detail later herein. Other ways of producing a similar conductive portion are readily apparent to those skilled in the art including vapor deposition of a conductive layer such as nickel or platinum. The conductive portion may also be formed by sequential vapor deposition of layers of chromium, gold, and chromium.

Conductive portion 24 is electrically connected to conductive tab 30 for coupling to electronic circuitry 32. It is noted that conductive portion 24 is connected to tab 30 by conventionally forming a hole into a doped region of substrate 12 and depositing a conductive material therein. This connection may also be accomplished by depositing conventional conductive traces on substrate 12 between conductive portion 24 and tab 30.

Figure 2:
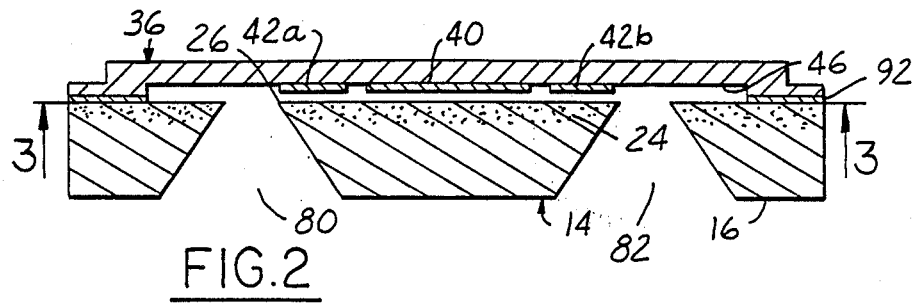
FIG. 2 is a cross-sectional view taken along line 2—2 of FIG. 1.

Continuing with FIG. 1, and also referring to the cross-sectional view shown in FIG. 2, suspended beam 36 is shown suspended over beam 14 and connected to supporting frame 16. As described in greater detail hereinafter with particular reference to FIGS. 5a-5h, beam 36 is fabricated by growing, and appropriately etching, a layer of polysilicon over substrate 12. Those skilled in the art will recognize that beam 36 may also be formed by other materials such as silicon oxide, or silicon nitride, or a hybrid combination of both. Further, beam 36 may be formed by bonding a silicon beam to substrate 12 utilizing a conventional anodic bonding process.

Beam 36 is dimensioned such that it is electronically driven into oscillation at a desired frequency as described in greater detail hereinafter. For the particular example presented herein, beam 36 is oscillated at approximately 60 kHz which is achieved by beam dimensions of approximately 1.6 um × 2952 um × 5795 um. In view of deflection by beam 14, and oscillating amplitude of beam 36, a spacing between the beams of 2 um was found to be desirable in this particular example.

Figure 3:
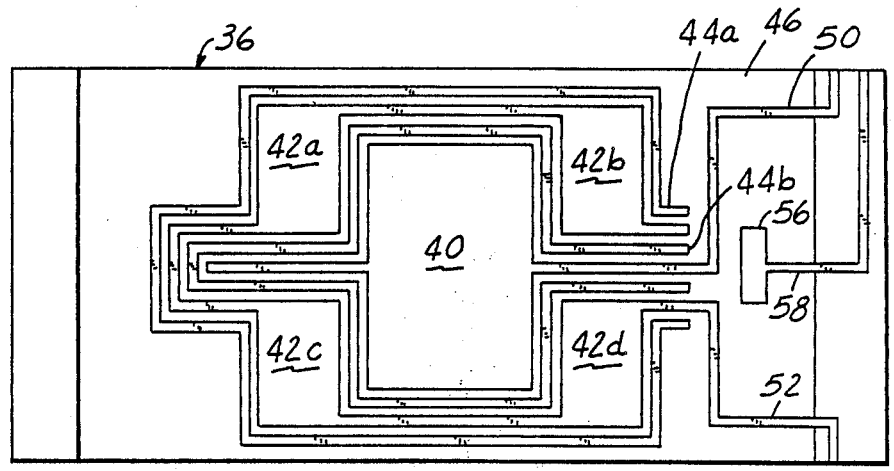
FIG. 3 is a bottom view of a portion of the embodiment shown in FIG. 1.

Reference is now made to the bottom view of beam 36 shown in FIG. 3. Sensing plate 40, driving plates $42_{a-d}$, and guard plates $44_{a-b}$ are shown formed on bottom surface 46 of beam 36. Plates 40, $42_{a-d}$, and $44_{a-b}$ are formed by etching a doped polysilicon layer as described later herein. It is noted however that alternate methods of forming these plates are utilized to advantage such as doping beam 36 in an appropriate pattern, or vapor depositing conductive layers such as chromium-gold-chromium on bottom surface 46. Forming the plates on a top or an intermediate surface of beam 36 may also be used to advantage.

Sensing plate 40 is shown coupled to conductive tab 64 on top surface 70 of substrate 12 by conductive trace 50. Driving plates $42_{a-d}$ are shown interconnected and connected to conductive tab 66 on top surface 70 by conductive trace 52. Guard plates $44_{a-b}$ are ohmically coupled through beam 36 to conductive tab 56 formed theron. Tab 56, and accordingly guard plates $44_{a-b}$, are coupled to conductive tab 68 on top surface 70 via conductive trace 58. Tabs 64, 66, and 68 are interconnect electronic circuitry 32 with plates 40, $42_{a-d}$, and $44_{a-b}$. As described in greater detail hereinafter, conductive traces 50, 52, and 58, and conductive tabs 58, 64, and 66, are formed by vapor depositing layers of chromium-gold-chromium such that the traces extend along bottom surface 46 of beam 36 and top surface 70 of substrate 12.

Force transducer 10 is hermetically sealed in a casing (not shown) filled with a gas at sufficient pressure to produce a desired damping of mechanical oscillations.

Figure 4:
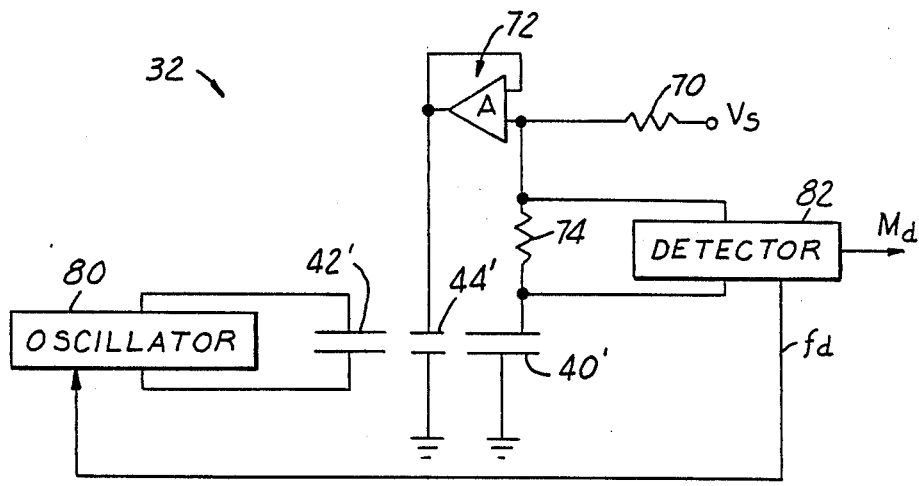
FIG. 4 is a block diagram of electronic circuitry coupled to the embodiment shown in FIGS. 1—3.

A description of electronic circuitry 32 is now provided with reference to the electronic schematic shown in FIG. 4. Sensing capacitor 40' is a representation of the capacitance between sensing plate 40 and conductive portion 24. Similarly, driving capacitor 42' represents the electrical equivalent of the capacitance between driving plates $42_{a-d}$ and conductive portion 24. Guard capacitor 44' represents the capacitance between guard plates $44_{a-b}$ and conductive portion 18. Voltage source $V_s$ is shown connected in series through resistor 70 to an input of isolation amplifier 72. Voltage source $V_s$ is also shown connected in series through resistor 70 and resistor 74 to one plate of capacitor 40', the other plate being connected to ground. Isolation amplifier 72 is shown as an operational amplifier having feedback to an input terminal for stability. The output of amplifier 72 is shown coupled to one plate of guard capacitor 44' which has its other plate connected to ground.

Oscillator 80 is shown coupled across driving capacitor 42' and responsive to feedback signal $f_d$ from detector 82 for driving beam 36 into oscillation at its resonant frequency. Detector 82 is shown coupled across resistor 74 for providing output signal $M_d$ and feedback signal $f_d$ which are proportional to deflection of beam 14'. The voltage applied to sensing capacitor 40' through the series interconnection of resistors 70 and 74 results in a current flow through resistor 74. Detector 82 detects changes in this current flow in response to capacitive changes in sensing capacitor 40'.

Circuitry 32 forms a phased lock loop wherein beam 36 is driven at resonance and the amplitude of deflection is controlled by feedback to maintain a constant amplitude of deflection. As beam 14 deflects in response to an acceleration force, there is corresponding change in feedback signal $f_d$ for maintaining constant amplitude deflection and constant frequency. There is also a corresponding change in output signal $M_d$ which is proportional to deflection of beam 14 and, accordingly, the force of acceleration applied thereto. In one particular application, beam 36 is oscillated at 60 kHz and beam 14 is dimensioned to respond at 12.5 Hz. Thus, the phased lock loop provides, in this example, approximately 4800 samples per cycle of deflection thereby achieving greater noise immunity than heretofore possible.

Figure 5A:
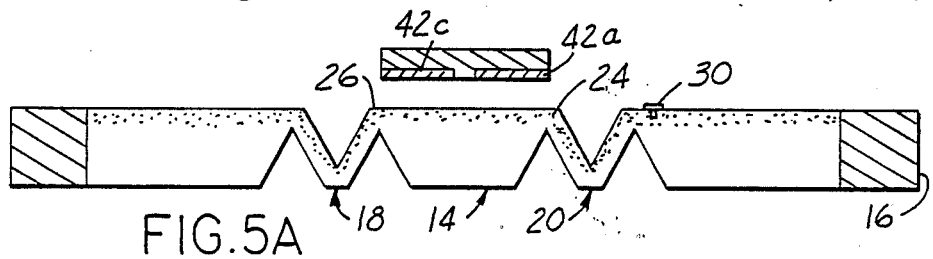
FIG. 5a is a cross-sectional view taken along lines 5a—5a in FIG. 1.
Figure 5B:
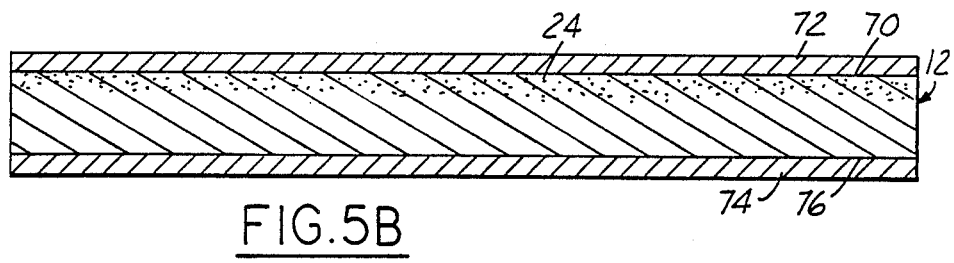
FIGS. 5b-5h illustrate various processing steps in manufacturing the embodiment shown in FIG. 1 as viewed along lines 5a—5a in FIG. 1.

An example of fabricating accelerometer 10 utilizing conventional silicon processing techniques is now described with reference to FIGS. 5a-5h. Referring first to FIG. 5b, a {100} silicon wafer 12 is shown having a conductive portion 24 patterned by conventionally doping ions, such as boron ions, through top surface 70. After the doping process, layer of silicon oxide 72 is grown over top surface 70 and layer of silicon oxide 74 is grown over bottom surface 76.

The process steps for suspending beam 14 from frame 16 and forming portions of flexing members 18 and 20 is now described with reference to FIG. 5c and FIG. 1. A masking pattern is first etched into silicon layer 74 utilizing conventional photolithographic techniques to form openings for cavity 80, cavity 82, and pits 84, 86, 88, and 90. An anisotropic etchant, such as aqueous potassium hydroxide, is then applied to the masked openings in silicon oxide layer 74. The etchant acts against the nominal {100} planes at a rate approximately 40 to 100 times greater than the intersecting {111} planes thereby forming pits 84, 86, 88, and 90. Concurrently, the etchant acts against the {100} planes to form cavities 80 and 82 extending from bottom surface 76 through top surface 70 along {111} planes. Thus, the outer surface of the walls defining cavities 80 and 82 follow the {111} planes intersecting top surface 70 at an angle of approximately 54.7°.

Footings 92 (FIG. 2), composed of silicon nitride, are formed into silicon oxide layer 72 for isolating beam 36. In a conventional manner, footing openings are patterned and etched into silicon oxide layer 72. A silicon nitride layer is then formed over top surface 70 and subsequently etched such that only footings 92 remain of the silicon nitride.

Figure 5C:
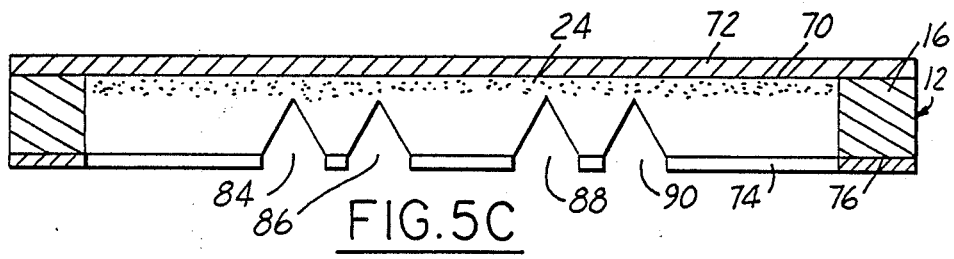
Figure 5D:
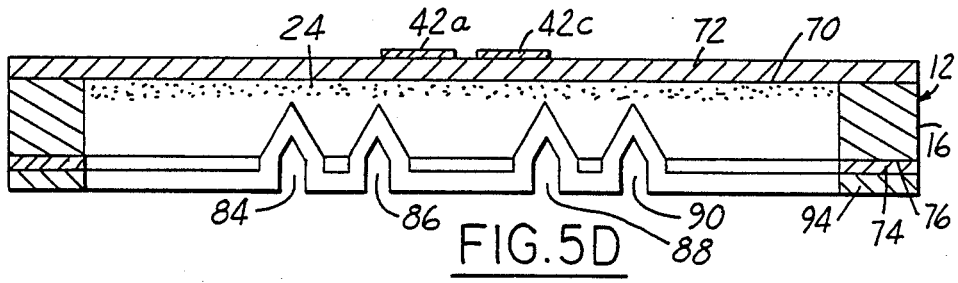

Referring to FIG. 5d, layer of silicon oxide 94 is grown over bottom surface 76 forming a passivation layer over pits 84, 86, 88, and 90. A first layer of polysilicon is then formed over silicon oxide layer 72 and appropriately etched to form sensing plate 40, driving plates $42_{a-d}$ and guard plates $44_{a-b}$ utilizing conventional photolithographic and etching techniques. The plates are also doped with ions, such as boron ions, such that they are conductive.

Figure 5E:
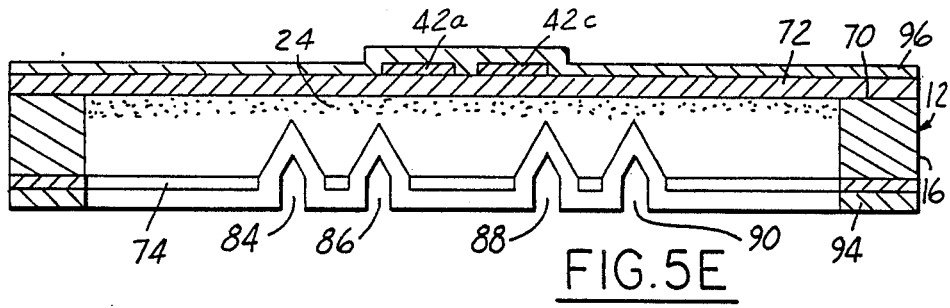
Figure 5F:
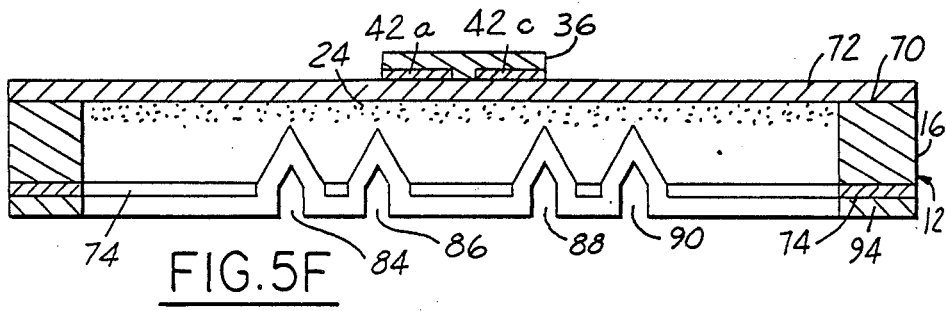
Figure 5G:
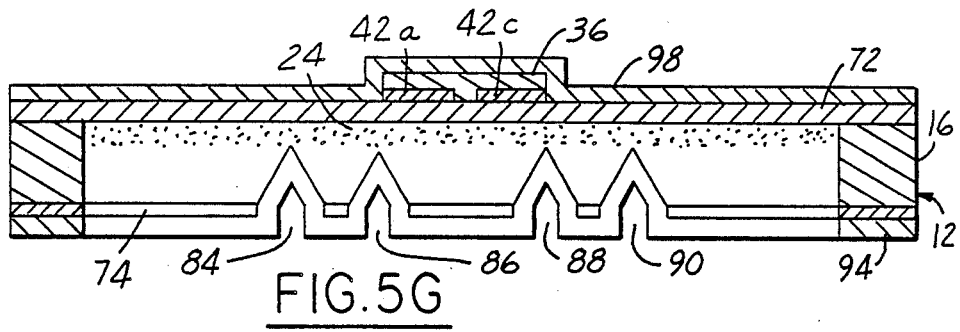

As shown in FIG. 5e, second layer of polysilicon 96 is then grown over top surface 70 covering plates 40, $42_{a-d}$, and $44_{a-b}$. Layer of polysilicon 96 is subsequently etched utilizing conventional photolithographic and etching techniques to form beam 36 as shown in FIG. 5f. Referring to FIG. 5g, silicon oxide layer 98 is then grown over top surface 70 to form a passivation layer over beam 36.

Figure 5H:
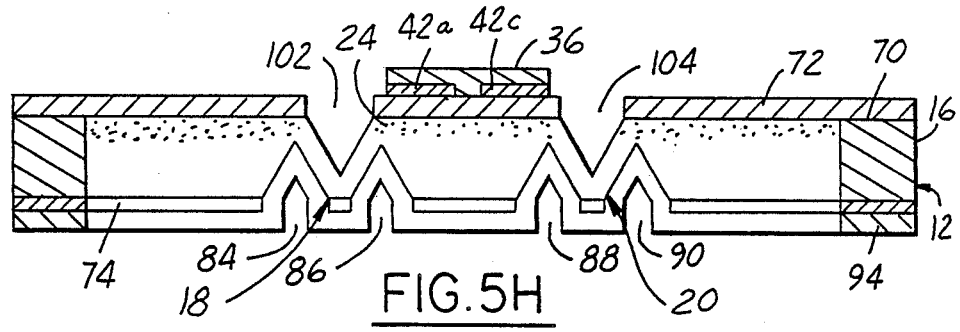

Now referring to FIG. 5h, top layers of silicon oxide 72 and 98 are appropriately masked using conventional photolithographic techniques and etched to form etchant patterns on top surface 70 aligned with the desired location of flexing members 18 and 20. An anisotropic etchant is then applied to form etchant pits 102 and 104 through top surface 70 thereby completing flexing members 18 and 20. It is noted that cavities 80 and 82 may also be formed by partial etching from bottom surface 76 and subsequent etching from top surface 70 when forming etchant pits 102 and 104. In this manner, a more compact accelerometer 10 is achieved. The silicon oxide layers are then etched, in a manner known as sacrificial etching, such that beam 36 becomes suspended over beam 14 as shown in FIG. 5a.

An alternate fabricating process is now described, with continued reference to FIGS. 5a-h wherein plates 40, $42_{a-d}$, and $44_{a-b}$ are formed from conductive layers rather than doped polysilicon. The process steps previously described herein with reference to FIGS. 5b-5c are repeated. With reference to FIG. 5d, plates 40, $42_{a-d}$, and $44_{a-b}$, are formed by vapor deposition of sequential layers of chromium, gold and chromium over silicon oxide layer 72. These layers are conventionally patterned and etched to define plates 40, $42_{a-d}$, and $44a-b$. In addition, traces 50, 52, and 58, and tabs 56, 64, 66 and 68 (FIGS. 1 and 2) are also defined during this step. The remaining process steps are the same as those previously described herein with reference to FIGS. 5e-5h.

Those skilled in the art will recognize that there are other processes utilizing silicon processing technology which may be utilized to advantage to produce a force transducer embodying the invention such as the one illustrated in FIG. 1. For example, conductive portion 24 could be formed by vapor deposition of a conductive material over top surface 70. Similarly, plates 40, $42_{a-d}$, and $44_{a-b}$ could be formed by vapor deposition of a conductive material over the top surface of beam 36. Conductive plates 40, $42_{a-d}$, and $44a-b$ could also be formed by appropriately doping suspended beam 36. It is also noted that suspended 36 may comprise other materials such as silicon oxide, silicon nitride, or a hybrid combination of both or other similar materials. In configurations utilizing a hybrid combination, plates 40, $42_{a-d}$, and $44_{a-b}$ could be formed between layers.

Suspended beam 36 may also be formed separately and bonded to substrate 12. For example, in another alternate embodiment, beam 36 is formed by etching a separate silicon wafer and bonding the resultant beam to supporting frame 16 by conventional anodic bonding techniques. In this later example, conductive plates 40, $42_{a-d}$, and $44_{a-b}$ are formed by either doping silicon beam 36 or depositing conductive material, such as nickel or platinum, on the underside of beam 36.

This concludes the description of the preferred embodiment. The reading of it by those skilled in the art will bring to mind many alterations and modifications without departing from the spirit and scope of the invention. For example, several alternate processes in constructing a force transducer have already been described. Accordingly, it is intended that the scope of the invention be limited only by the following claims.

What is claimed:

1. An apparatus for sensing an applied force, comprising:
    a first suspended beam being deflectable only in response to an orthogonal component of the applied force;
    a second suspended beam positioned opposite said first suspended beam, said second suspended beam oscillating in response to application of electrical power and position of the first beam;
    power means for applying said electrical power between said first suspended beam and said second suspended beam in relation to deflection of said first suspended beam; and sensing means for sensing the applied force by sensing electrical power between said first suspended beam and said second suspended beam.

2. The apparatus recited in claim 1 wherein said power means comprises a phased lock loop having feedback from said sensing means for oscillating said second suspended beam at a resonant frequency.

3. An apparatus for sensing an applied force, comprising:

a first suspended beam etched from a silicon substrate, said first suspended beam having a first conductive portion and being deflectable only in response to the applied force;

a second suspended beam coupled to said substrate such that it is suspended opposite said first suspended beam, said second suspended beam including a second conductive portion and a third conductive portion both being positioned opposite said first conductive portion, said second suspended beam oscillating at a resonant frequency only in response to application of electrical power;

power means for applying said electrical power between said first conductive portion and said second conductive portion in relation to deflection of said first suspended beam to oscillate said second suspended beam at said resonant frequency; and sensing means for sensing the applied force by sensing electrical power between said third conductive portion and said first conductive portion.

4. The apparatus recited in claim 3 wherein said power means includes a phased lock loop having feedback from said sensing means for oscillating said second suspended beam at its resonant frequency.

5. The apparatus recited in claim 3 wherein said first conductive portion is formed by doping a portion of said first suspended beam.

6. The apparatus recited in claim 3 wherein said first conductive portion is formed by coupling a conductive layer to a portion of said first suspended beam.

7. The apparatus recited in claim 3 wherein said second suspended beam is comprised of polysilicon.

8. The apparatus recited in claim 3 wherein said second suspended beam is comprised of silicon.

9. The apparatus recited in claim 3 wherein said second suspended beam is comprised of silicon oxide.

10. The apparatus recited in claim 3 wherein said second suspended beam is comprised of silicon nitride.

11. The apparatus recited in claim 3 wherein said second suspended beam is comprised of layers of silicon oxide and silicon nitride.

12. The apparatus recited in claim 3 wherein said second and said third conductive portions are formed by coupling conductive layers to said second suspended beam.

13. The apparatus recited in claim 12 wherein said conductive layers each comprise a conductive metal material.

14. The apparatus recited in claim 12 wherein said conductive layers each comprise a doped polysilicon material.

15. An apparatus for detecting an acceleration force, comprising:

a first suspended beam defined by a portion of a silicon substrate between a pair of cavities, said first suspended beam being deflectable only in response to the acceleration force and having a first conductive portion;

a pair of flexing means symmetrically positioned around said first suspended beam and integrally formed from said substrate for enabling deflection of said first suspended beam in response to the acceleration force;

a second suspended beam coupled to said substrate and suspended opposite said first suspended beam, said second suspended beam having a second conductive portion and a third conductive portion each positioned opposite said first conductive portion, said second suspended beam oscillating at a resonant frequency only in response to application of electrical power;

power means for applying said electrical power between said first conductive portion and said second conductive portion as a function of deflection of said first suspended beam to oscillate said second suspended beam at said resonant frequency; and sensing means for sensing the acceleration force by sensing electrical power between said third conductive portion and said first conductive portion.

16. The apparatus recited in claim 15 wherein said power means includes a phased lock loop having feedback from said sensing means for oscillating said second suspended beam at its resonant frequency and wherein each of said conductive portions comprise capacitive plates.

17. The apparatus recited in claim 15 wherein said second suspended beam is comprised of polysilicon.

18. The apparatus recited in claim 15 wherein said second suspended beam is comprised of silicon nitride.

19. The apparatus recited in claim 15 wherein said second and said third conductive portions are formed by coupling conductive layers to said second suspended beam.

20. The apparatus recited in claim 19 wherein said conductive layers each comprise a conductive metal material.

21. The apparatus recited in claim 19 wherein said conductive layers each comprise a doped polysilicon material.

* * * * *